(12) United States Patent
Krishnamurthy et al.

(10) Patent No.: US 9,305,603 B2
(45) Date of Patent: Apr. 5, 2016

(54) METHOD AND APPARATUS FOR INDEXING A VIDEO STREAM

(75) Inventors: Balaji Krishnamurthy, Noida (IN); Gajinder Singh, Paonta Sahib (HP) (IN)

(73) Assignee: ADOBE SYSTEMS INCORPORATED, San Jose, CA (US)

( * ) Notice: Subject to any disclaimer, the term of this patent is extended or adjusted under 35 U.S.C. 154(b) by 1259 days.

(21) Appl. No.: 12/803,789

(22) Filed: Jul. 7, 2010

(65) Prior Publication Data

US 2015/0199996 A1 Jul. 16, 2015

(51) Int. Cl.
*H04N 9/80* (2006.01)
*G11B 27/30* (2006.01)
*H04N 5/76* (2006.01)
*G11B 27/28* (2006.01)
*H04N 9/82* (2006.01)
*G06K 9/00* (2006.01)

(52) U.S. Cl.
CPC ........ *G11B 27/3081* (2013.01); *G06K 9/00744* (2013.01); *G06K 9/00758* (2013.01); *G11B 27/28* (2013.01); *H04N 5/76* (2013.01); *H04N 9/8205* (2013.01)

(58) Field of Classification Search
USPC .................. 386/200–201, 230, 231, 248, 262
See application file for complete search history.

(56) References Cited

U.S. PATENT DOCUMENTS

| | | | |
|---|---|---|---|
| 7,356,830 B1 * | 4/2008 | Dimitrova | 725/51 |
| 7,630,613 B2 * | 12/2009 | Murabayashi et al. | 386/344 |
| 7,801,910 B2 * | 9/2010 | Houh et al. | 707/765 |
| 2008/0066104 A1 * | 3/2008 | Murakoshi | 725/39 |

* cited by examiner

*Primary Examiner* — Nigar Chowdhury
(74) *Attorney, Agent, or Firm* — Keller Jolley Preece

(57) ABSTRACT

Embodiments including a method and apparatus for indexing a video stream are disclosed. In one embodiment, a method for indexing a video stream comprises accessing a video stream comprising a plurality of frames. For each frame, the method determines salient points computes a cross entropy value for each salient point, and sums the cross entropy values to form a frame information number. A sequence of frame information numbers for the plurality of frames in the video streams forms an index value for the video stream.

20 Claims, 8 Drawing Sheets

METHOD AND APPARATUS FOR INDEXING A VIDEO STREAM

BACKGROUND

1. Field

Embodiments generally relate to video stream processing and, more particularly, to a method and apparatus for indexing a video stream.

2. Description of the Related Art

Video stream processing techniques are becoming increasingly popular. In many instances, proper alignment between two video streams is an important requirement for the accurate stream processing. For example, non-linear video editors (NLEs) use video stream alignment to form a continuous stream from two or more constituent streams where each of the constituent streams may be created from different video sources. Typically, the sources are cameras viewing a scene from different angles and the NLE seamlessly combines the constituent streams to facilitate a transition from one viewpoint to another. To achieve a seamless stream combination, common content in the constituent streams is found, aligned and combined to transition from one stream to another. Other applications that require video stream alignment are fingerprinting of video for indexing, searching and retrieval purposes, detecting unauthorized display of copyrighted video content, determining video watermarks and/or the like. In each of these applications, a technique is used to determine common content between at least two streams, and then compare the content or transition from stream to stream at the common content location. These applications generally require a robust alignment solution that operates well when faced with a variety of video degradations such as compression, blurring, affine transformation and global changes within the stream to the intensity, colors and contrasts. For facilitate development of practical applications, the alignment technique also needs to be computationally inexpensive.

There are conventional techniques for content based video synchronization and combining, but such techniques primarily utilize complex computational resources and consume a significant amount of time to complete the alignment. For example, salient points in each frame of a video stream may be identified using such conventional techniques as SIFT (Scale Invariant Feature Transform), SURF (Speeded Up Robust Features), DAISY, and Harris corner processing. Next, in a frame-by-frame manner, the salient points are compared between streams until a frame match is found. The streams can be aligned (synchronized) at the common content frame or frames and further processing may be performed. However, this is a computationally expensive procedure and may not be of practical use in most applications.

Therefore, there is a need in the art for an improved method and apparatus for indexing a video stream to facilitate stream comparison.

SUMMARY

Embodiments including a method and apparatus for indexing a video stream are disclosed. In one embodiment, a method for indexing a video stream comprises accessing a video stream comprising a plurality of frames. For each frame, the method determines salient points, computes a cross entropy value for each salient point, and sums the cross entropy values to form a frame information number. A sequence of frame information numbers for the plurality of frames in the video streams forms an index value for the video stream.

Figure 1:
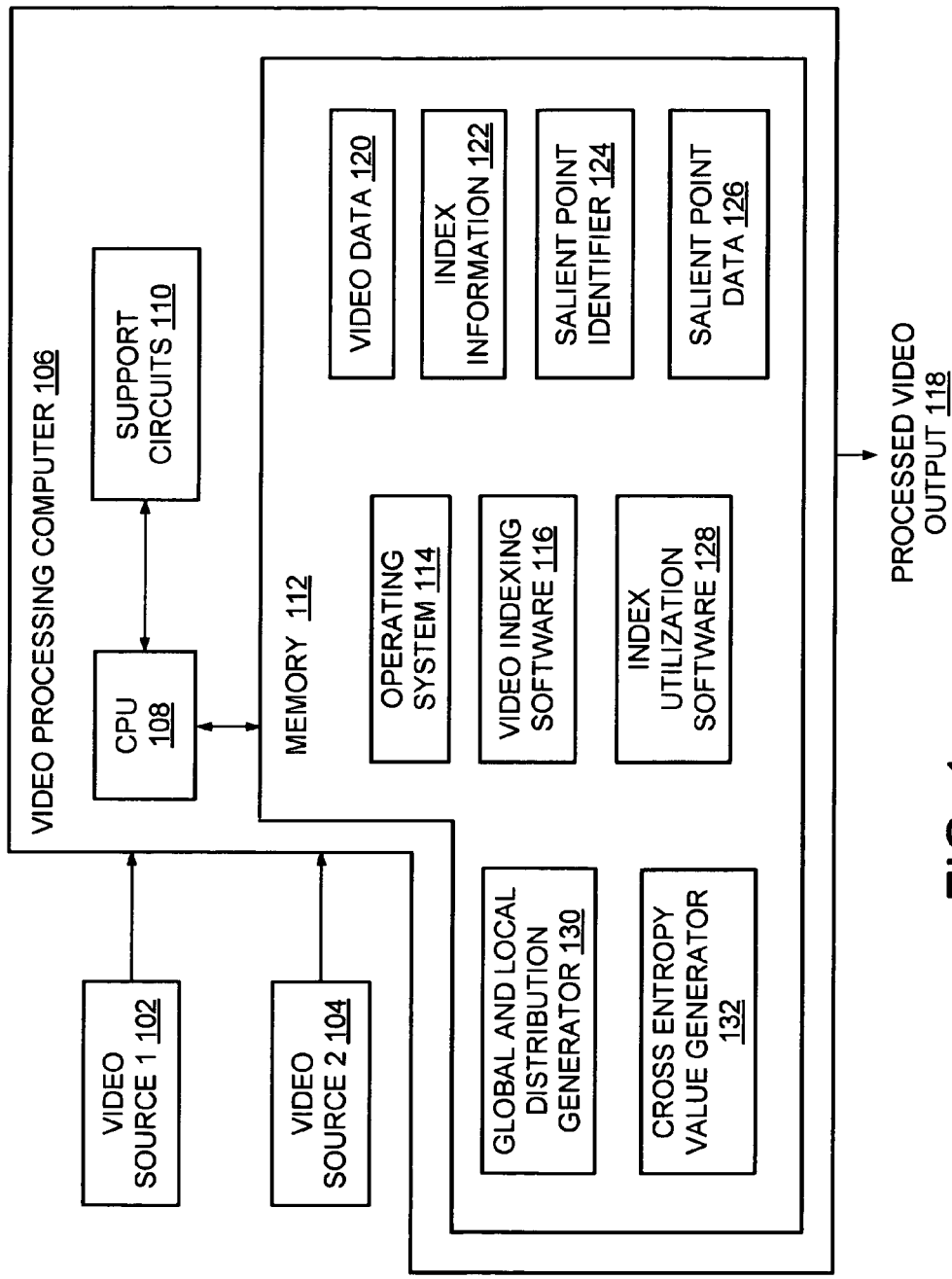
FIG. 1 is a block diagram of a system for indexing a video stream, according to one or more embodiments.

While the method and apparatus for indexing a video stream is described herein by way of example for several embodiments and illustrative drawings, those skilled in the art will recognize that the method and apparatus for indexing a video stream is not limited to the embodiments or drawings described. It should be understood, that the drawings and detailed description thereto are not intended to limit embodiments to the particular form disclosed. Rather, the intention is to cover all modifications, equivalents and alternatives falling within the spirit and scope of the method and apparatus for indexing a video stream as defined by the appended claims. Any headings used herein are for organizational purposes only and are not meant to limit the scope of the description or the claims. As used herein, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION OF EMBODIMENTS

Various embodiments of a method and apparatus for indexing a video stream are described. In the following detailed description, numerous specific details are set forth to provide a thorough understanding of claimed subject matter. However, it will be understood by those skilled in the art that claimed subject matter may be practiced without these specific details. In other instances, methods, apparatuses or systems that would be known by one of ordinary skill have not been described in detail so as not to obscure claimed subject matter.

Some portions of the detailed description which follow are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular functions pursuant to instructions from program software.

Algorithmic descriptions or symbolic representations are examples of techniques used by those of ordinary skill in the signal processing or related arts to convey the substance of their work to others skilled in the art. An algorithm is here, and is generally, considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these or similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

FIG. 1 is a block diagram of a system 100 for indexing a video stream, according to one or more embodiments. The system 100 includes a first video source 102, a second video source 104, each for providing video streams to a video processing computer 106. One embodiment of a computer system that can be used to implement the video processing computer 106 is described in detail with respect to FIG. 7 below.

In general, the video processing computer 106 is a type of a computing device (e.g., a mobile phone, a Personal Digital Assistant (PDA), hand-held gaming device, and/or the like) known to one of ordinary skill in the art having the benefit of this disclosure. The video processing computer 106 comprises a Central Processing Unit (CPU) 108, various support circuits 110 and a memory 112. The CPU 108 may comprise one or more commercially available microprocessors or microcontrollers that facilitate data processing and storage. Various support circuits 110 facilitate operation of the CPU 108 and may include clock circuits, buses, power supplies, input/output circuits and/or the like. The memory 112 includes a Read Only Memory, Random Access Memory, disk drive storage, optical storage, removable storage, and the like. The memory 112 stores an operating system 114, video data 120, index information 122, video indexing software 116, and index utilization software 128. In one embodiment, the video indexing software 116 utilizes a global and local distribution generator 130, a cross entropy value generator 132, a salient point identifier 124 and salient point data 126 to create index information 122 related to the video data 120. The index information 122 may be used by the index utilization software 128 to process the video data 120 from sources 102 and 104, creating a processed video output 118. The operation of one embodiment of the video indexing software is described in detail with respect to FIG. 2 below and the operation of one embodiment of the index utilization software 128 is described in detail with respect to FIG. 5 below.

The operating system 114 provided on video processing computer 106 may be MS-DOS®, MS-WINDOWS®, OS/2®, UNIX®, Linux®, or another operating system. The operating system 114 generally manages various computer resources (e.g., network resources, data storage resources, file system resources and/or the like). The operating system 114 is configured to execute operations on one or more hardware and/or software devices, such as Network Interface Cards (NICs), hard disks, virtualization layers, firewalls and/or the like. For example, the various software packages call commands associated with the operating system 114 (i.e., native operating system commands) to perform various file system and/or storage operations, such as creating files or metadata, writing data to the files, reading data from the files, modifying metadata associated with the files and/or the like. The operating system 114 may call one or more functions associated with the video indexing software 116 to execute various file system and/or storage operations. As an example, the operating system 114 may utilize a device driver associated with a Network Interface Card (NIC) card to communicate data to another computer.

According to one or more embodiments, the video data 120 includes dynamic or static content in the form of images, video and/or audio and/or the like. The video data 120 are stored as multimedia files, such as a SWF file in the memory 112. The SWF file format is defined by the SWF File Format Specification (version 10) as published, at http://www.adobe.com/devnet/swf/pdf/swf_file_format_spec_v10.pdf by Adobe Systems Incorporated of San Jose, Calif. In other embodiments, the video data 120 may be other frame based video data such as MPEG, JPEG, MPEG-2, MPEG-4 h.264, and the like. According to one or more embodiments, the index information 122 is created as described with respect to FIG. 2 below.

In one embodiment, the video processing computer 106 receives two video streams (e.g., frame sequences) from two different video resources, such as the first video source 102, and the second video source 104. The video indexing software 116 utilizes a salient point identifier 124, salient point data 126, global and local distribution generator 130 and cross entropy value generator 132. According to one or more embodiments, the video indexing software 124 includes software code (e.g., processor executable instructions) that is configured to create the index information 122 as well as execute software code implementing the global and local distribution generator 130 and cross entropy generator 132. According to one or more embodiments, the index utilization software 128 includes software code (e.g., processor executable instructions) that is configured to utilize the index data to determine common content amongst video streams and/or perform other video processing using the index information 122.

In one or more embodiments, the first video source 102 and the second video source 104 may provide one or more objects, such as a streaming multimedia file (e.g., audio, video, image and/or the like), generally referred to interchangeably herein as video, video streams or video frame sequences. According to one or more embodiments, the two video streams are publishing streams received from different satellites links operating at different bandwidth. According to other embodiments, the video streams are from independent publishers, such as two FMLEs (i.e., FLASH Media Live Encoder files) on different computers publishing the content. Further, the sources 102 and 104 may be "live feeds", "recorded feeds" or video segment accessed from memory. In other embodiments, the sources 102, 104 may be different cameras imaging the same scene from different angles. In still further embodiments, first video source 102 may supply a reference video or image and the second video source 104 may supply a target video that is to be compared with the reference video or image for various purposes, as described below.

According to one or more embodiments, the video indexing software 116 includes software code (e.g., processor executable instructions) that is configured to create index values representing the video streaming and the index utilization software 128 is executed to find common content within video frame sequences from the first video source 102 and the second video source 104. The video indexing software 116 creates the index information 122 for each of the video frame sequences and then the index utilization software 128 compares the index information 122 of each video frame sequence to determine common content amongst the video streams.

Figure 2:
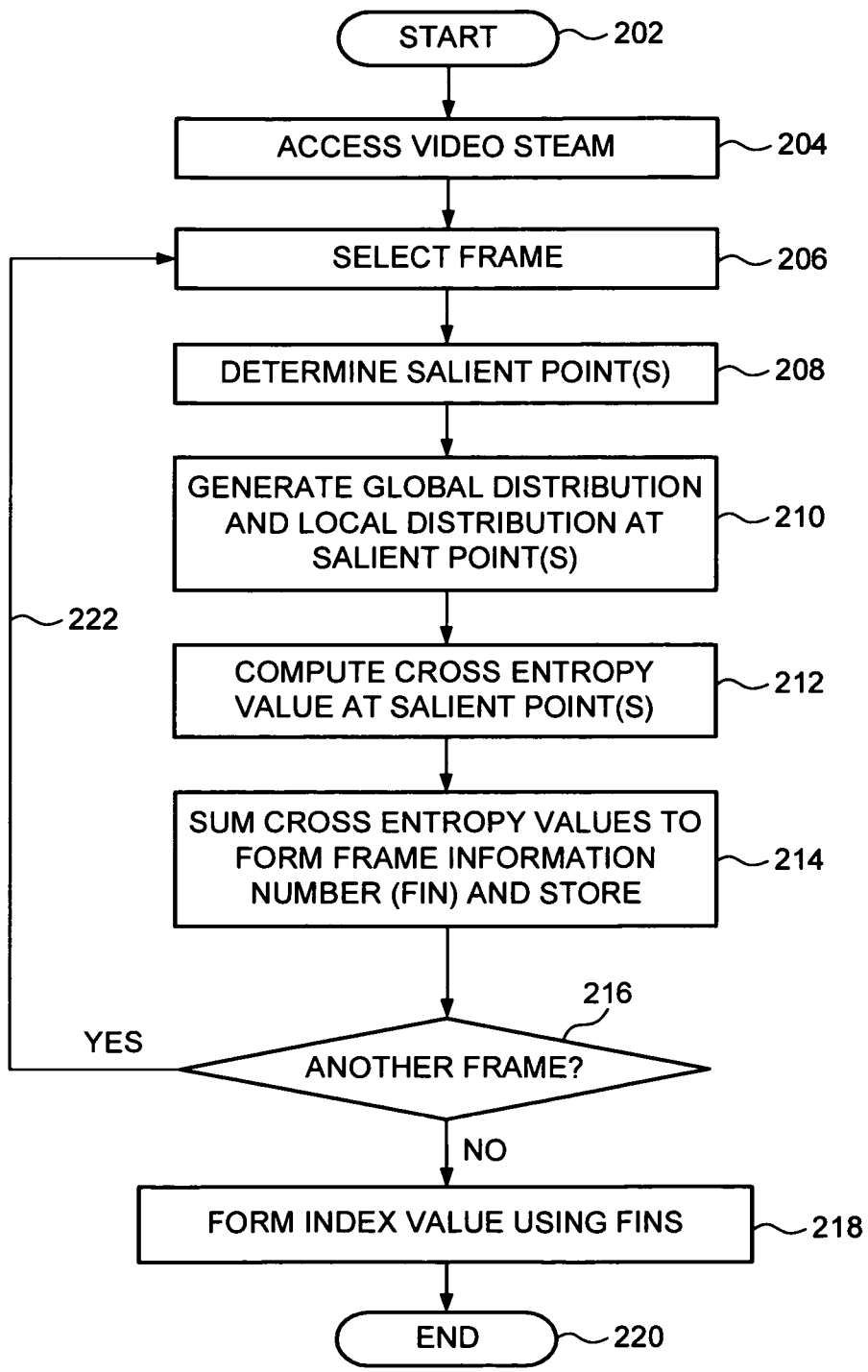
FIG. 2 illustrates a flow diagram of a method for creating an index of frame information numbers for a video stream, according to one or more embodiments.

FIG. 2 illustrates a flow diagram of a method 200 for creating an index for a video stream, according to one or more embodiments. The method 200 represents one embodiment implemented through execution of the video indexing software 116 of FIG. 1. The method 200 starts at step 202 and proceeds to step 204, at which a video stream is accessed. In one embodiment, the method 200 accesses the video streams communicated by the first video source 102 and/or the second video source 104 (refer to FIG. 1). The video stream may be retrieved from memory, buffered or provided as a "live feed". In some embodiments, the video stream may be subsampled to reduce the number of pixels to be processed. In a particular embodiment, the subsampling process reduces each 720×480 frame to 72×48 pixels.

At step 206, a frame within the video stream is selected. The selected frame may be the next frame in a sequence of frames of the video stream. At step 208, the method 200 determines the salient points within the selected frame. In various embodiments, the set of salient points of an image (frame) may be defined using various feature detection techniques including a SIFT process, SURF process, DAISY process or Harris corner detection process. Alternatively, in one embodiment of the invention, a cross entropy technique can be used to determine salient points within the frame. Various embodiments for determining salient points are described in detail with respect to FIG. 6 below. In general, the salient points define regions in the frame where the imagery captured in the frame provides substantial texture and/or color that may be used to uniquely define the frame.

At step 210, the method 200 generates a global probability distribution representing texture and/or color information within the frame and a local probability distribution representing texture and/or color information within a window of pixels surrounding the salient point. The window may be variable (e.g., defined by an amount of texture at or near the salient point) or fixed in size for each salient point within the frame. Various embodiments for generating the global and local distributions are described in detail with respect to FIG. 3 below.

At step 212, the method 200 utilizes the global distribution and the local distribution to compute a cross entropy value for each salient point. The cross entropy value represents the significance of a point with respect to the content of the frame as a whole. In general, let $X=(x_1, x_2, \ldots, x_n)$, whose values $x_i$ are drawn from a global probability distribution given by p. The entropy of a signal is $(X,p)=-\Sigma_{i=0}^n p(x_i)\log(p(x_i))$. If a different distribution q (e.g., a local distribution within a window) is used instead of p to model the distribution, the cross entropy is $H_x(X,p,q)=-\Sigma_{i=0}^n p(x_i)\log(q(x_i))$, to determine a number of extra bits needed to code the signal. The cross entropy is closely related to the Kullback-Leibler divergence between the probability distributions p and q, where $$KL(p:q)=\Sigma_{i=0}^n p(xi)\log(p(xi))/\log(q(xi))= H_x(X,p,q)-H(X,p) \quad (1)$$

Using the foregoing generalized cross entropy computation within the window surrounding the salient point, the method 200 computes a cross entropy value for the salient point in the window. According to one or more embodiments, let I(x, y) be the selected video frame and let q be the global probability distribution of the frame. The global distribution q can be found, for example, as described with respect to FIG. 3 below. Let l=(j,i) be a point in the window and let ql be the local probability distribution in the window W around the salient point l (e.g., generated as described with respect to FIG. 3 below). The cross entropy value at the point l, denoted by ξ(l) is defined as:

$$\xi(l)=H_x(W,q_l,p)=-\Sigma_{\alpha \in W} p_l(I(\alpha))\log(q(I(\alpha))). \quad (2)$$

At step 214, the method 200 sums the cross entropy values computed for each salient point to form a frame information number (FIN). Specifically, given a set of salient points S,s, the method 200 computes and stores the saliency of the selected frame as a FIN, as $$\varsigma(I)=\Sigma_{l \in S}\xi(l). \quad (3)$$

The FIN is a sum of the significant cross entropy values computed for all the salient points within the frame. The FIN is stored in memory as part of the index information 122 of FIG. 1.

At step 216, a determination is made if there is another frame within the video stream. If there is another frame, then the method 200 proceeds to step 206 to select a frame, then determine the salient points and FIN of the selected frame. The frames within the video stream are typically, but not necessarily, processed in the order within the video stream. If there are no more frames in the video stream then, at step 218, an index is formed using the FINs. In one embodiment, a set of FINS associated with the frames in a video stream form an index value for that particular set of frames. As such, each video stream processed using method 200 is represented by an index value, e.g., a set of FINs, where each FIN represents the salient content of a frame within the video stream. By using salient points to define the FIN, the index value is robust and generally not affected by degradation of the video quality through blurring, compression, transformation, or global changes in intensity, colors or contrasts. Once the index value is formed, the method 200 proceeds to step 220 at which the method 200 ends.

As is described in detail with respect to FIG. 5 below, matching of video streams for alignment or content searching depends upon the index of FINs that is computed for each frame sequence. Two frames that have substantially similar content will have numerically similar FINs, while two frames containing substantially different content will have FINs that are numerically different. Thus, cross correlating two sets of FINs produces a maximum result when a match is found. Such a cross correlation technique is fast and robust. The use of salient points to compute the index enables the index to survive re-sampling (or blurring), compression, geometric transformation of global changes in brightness or contrast. Since a FIN measures the relative importance of the salient points with respect to the global distribution, the FIN remains invariant in spite of any image degradation. Thus, the foregoing indexing technique is useful in any application where video frame sequence comparison is required.

Figure 3:
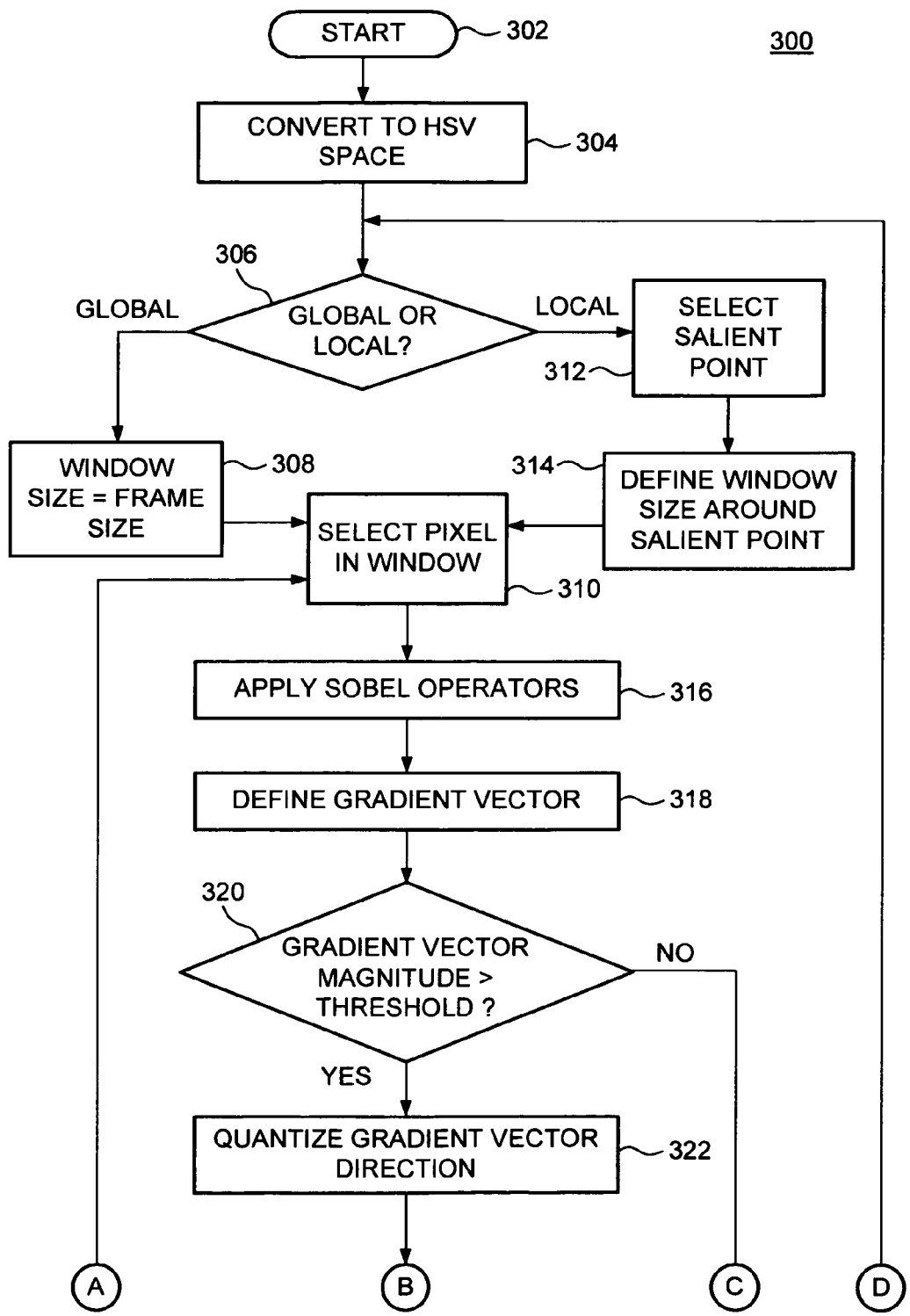
FIG. 3 illustrates a flow diagram of a method for generating a global probability distribution and a local probability distribution for information within a frame according to one or more embodiments.
Figure 3:
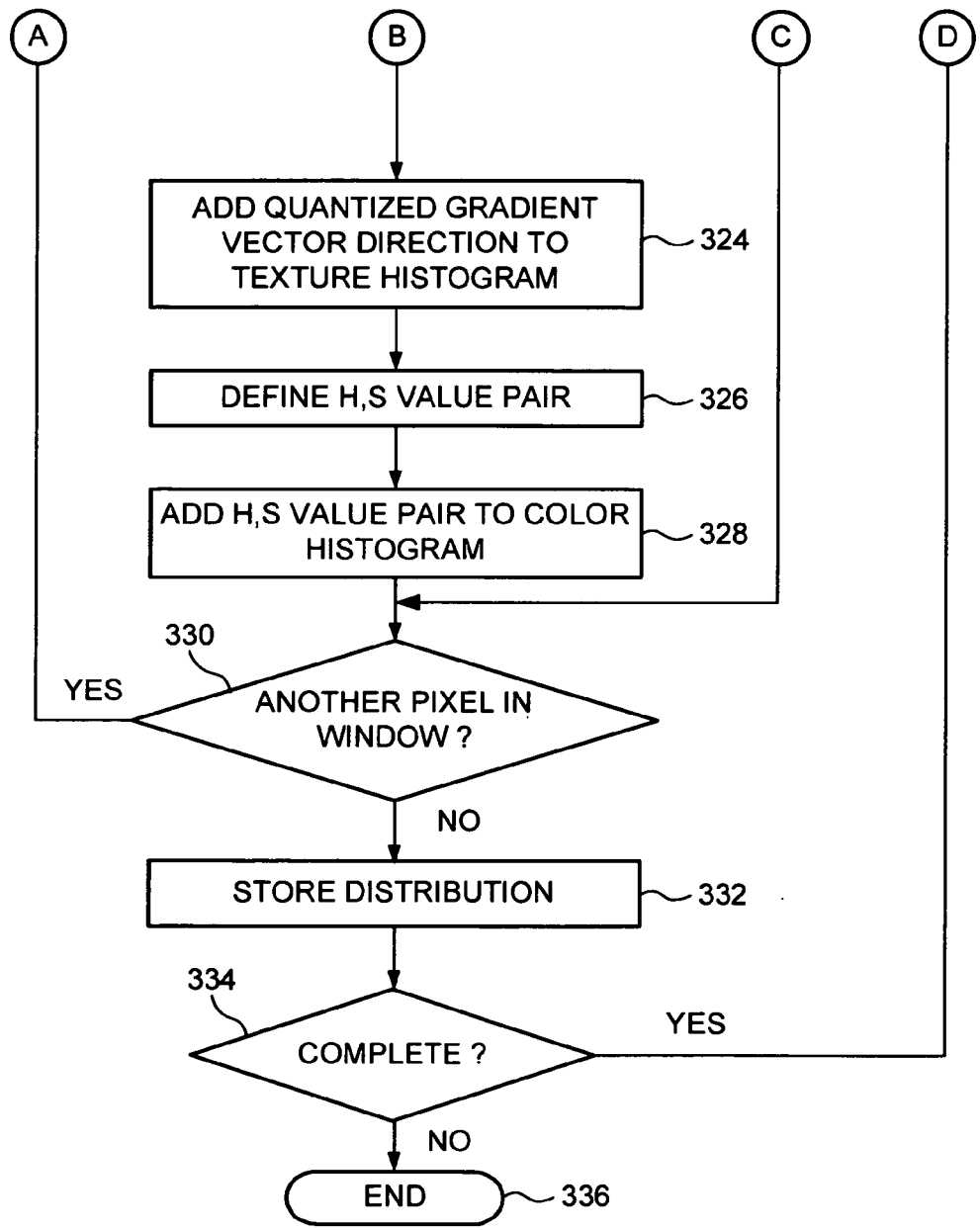

FIG. 3 illustrates a flow diagram of a method 300 for generating global and local probability distributions for a selected frame according to one or more embodiments of the invention. The method 300 represents an embodiment resulting from execution of the global and local distribution generator 130 of FIG. 1. In one embodiment, the method 300 is generally called from step 210 of FIG. 2.

Each salient point (pixel or group of pixels) with an image/video conveys texture information and color information. One embodiment of the invention uses both texture and color information to index the frame. By using both color and texture information in the indexing process, a very robust index is created. In other embodiments, only color or texture may be used in the indexing process.

The method 300 begins at step 302 and proceeds to step 304, where in one embodiment, the color information is separated from the intensity information by transforming the frame from red, blue green (RGB) space to Hue, Saturation and Value (HSV) space, where the H and S channels contain pixel color information and the V channel contains pixel intensity information.

At step 306, the method queries whether a global or local distribution is to be generated. If a global distribution is to be generated, the method proceeds to step 308, where a window size is set to equal the entire frame size. In some embodiments, the global distribution may use a window that is less than the entire frame; however, the number of pixels included in the window for a global distribution is larger than the number of pixels used in the window for generating the local distribution.

If, at step 306, a local distribution is to be generated, the method proceeds to step 312 where a salient point is selected (i.e., a location within the frame of a salient point). At step 314, a window (e.g., a rectangle or other geometric shape) of pixels surrounding the salient point is defined. The window size may be fixed, e.g., 8×8 pixels or some other fixed size, for each salient point within the frame. In other embodiments, the window may be varied in size from salient point to salient point depending upon the amount of image texture at or near the salient point (e.g., the magnitude of the V channel at or near the salient point).

At step 310, a pixel within the window is selected. At step 316, the method 300 applies a Sobel operator to the window in the x-direction and then in the y-direction, or vice versa. The Sobel operator is applied to every point in the window defined to surround the salient point. A Sobel operator, in essence, produces a partial derivative of the window content in the x-direction and the y-direction, respectively. The Sobel operator may be applied to the original pixel values of the RGB space frame or to the intensity values (V) of the HSV space frame. At step 318, the method 300 uses the two partial derivatives to define a magnitude and direction of a gradient vector at each pixel in the window.

At step 320, the method 300 queries whether the gradient vector magnitude is larger than a threshold (i.e., a magnitude that represents a significant texture gradient at the pixel). If the query is negatively answered, the method 300 proceeds to step 330 to access the next pixel in the window (if any). If the query is positively answered to step 322. At step 322, the gradient vector direction is quantized to a discrete set of angles. At step 324, a texture histogram (HIST_T) is populated with the gradient vector direction. In various embodiments, any gradient vector direction may be added to the histogram or, to use only the most significant gradients, only magnitudes greater than a predefined threshold may be added to the histogram (i.e., as determined in step 320). The texture histogram is a one-dimensional histogram measuring the frequency of the various gradient directions within the window. Using Sobel operators to define a gradient vector to represent texture at particular points in a frame represents one specific technique for texture representation; other forms of vector generation and/or texture representation may be used.

At step 326, the method defines a color value pair using the H and S values from the H and S channels at the salient point. In one embodiment, when using 8-bit images, the pixel values for each channel are numbers in the range [0,255]. The method 300 generates a two dimensional array (HIST_C), of dimension 256×256, which may be used to count the frequency of occurrence of pairs of pixel values in the H and S channels.

$HIST\_C[p,q]=$
  #(pixels whose $H$ value=$p$ and $S$ value=$q$)

At step 338, the method 300 adds the H,S value pair for the selected pixel to the color histogram.

At step 330, the method 300 queries whether another pixel is to be processed from within the window. If there is an unprocessed pixel, the method 300 returns to step 310 to select the next pixel in the window. If no unprocessed pixels exist in the window, the method 300, at step 332, stores the distribution for the window. If a global distribution was generated, the distribution represents a saliency level of the entire frame or a significant portion of the frame. If a local distribution was generated, the distribution represents a saliency level within the window.

At step 334, the method 300 queries whether all the distributions have been completed, i.e., has the method generated a global distribution for the frame and a local distribution for each salient point in the frame. If the query is negatively answered, the method returns to step 306 to either generate the global distribution for the frame or select the next salient point for generating a local distribution. If all the distributions are complete, the method 300 ends at step 336.

Figure 4:
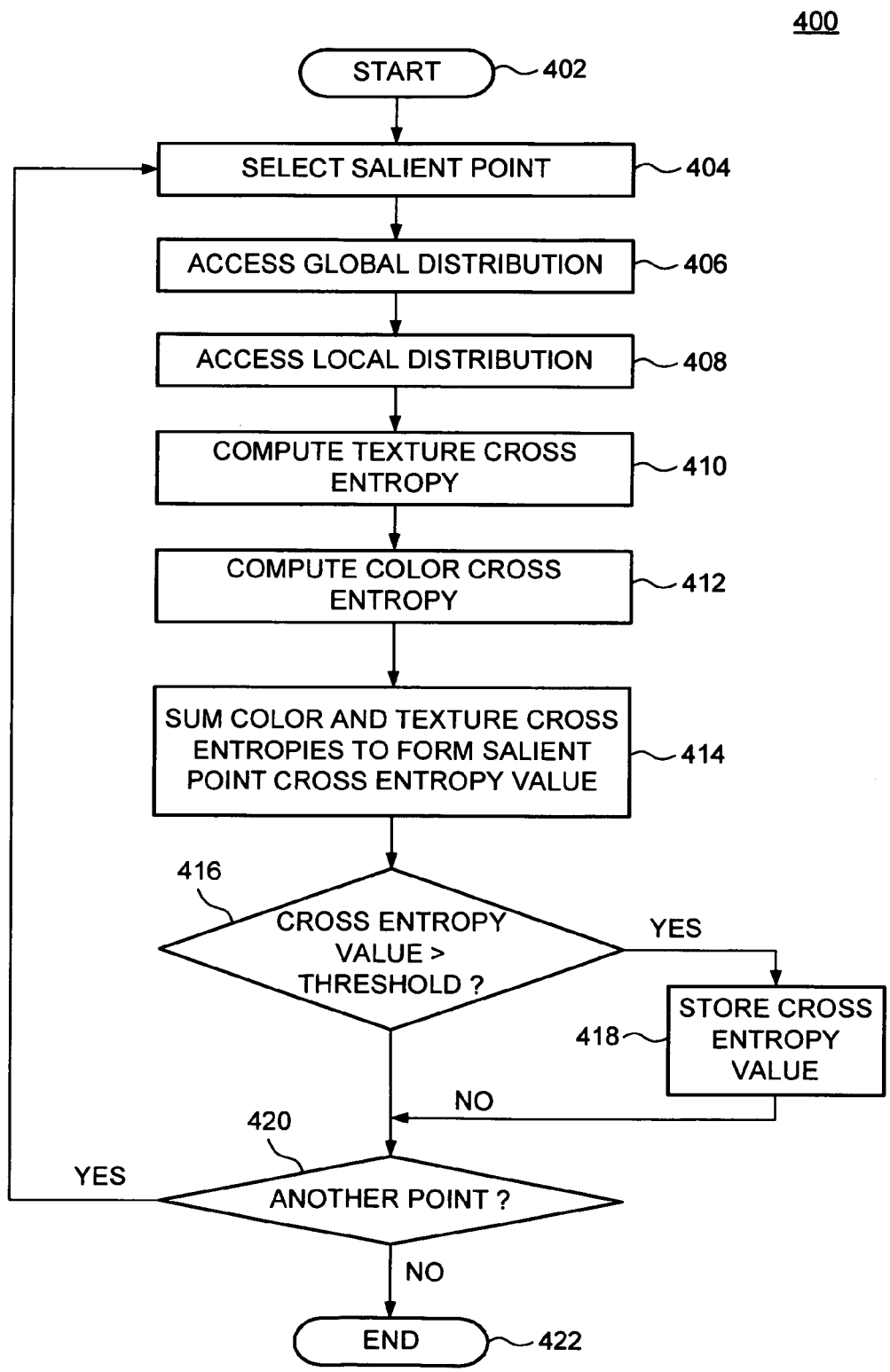
FIG. 4 illustrates a flow diagram of a method for computing at least one cross entropy value according to one or more embodiments.

FIG. 4 illustrates a flow diagram of a method 400 for computing at least one cross entropy value using the global and local distributions according to one or more embodiments. The method 400 represents an embodiment resulting from execution of the cross entropy value generator 132 of FIG. 1. In one embodiment, the method 400 is generally called from step 212 of FIG. 2.

At step 404, the method 400 selects a salient point within the frame. At steps 406 and 408 respectively, the method 400 accesses from memory the global distribution for the frame and the local distribution for the selected salient point. Each distribution (global and local) includes a texture distribution (HIST_T) and a color distribution (HIST_C). According to one or more embodiments, the method 400 computes, at step 410, a texture cross entropy value for the selected salient point and, at step 412, computes a color cross entropy value for the selected salient point. Specifically, let I(x,y) be a video frame and let q be the global probability distribution (texture or color) of the frame. The distribution q may be found, as described above, by constructing the histogram of the frame intensities and/or color. In other embodiments, the distribution q may be computed in other manners. Let l=(j,i) be a point in the window and let ql be the local probability distribution in the window W around the salient point l. The cross entropy value at the point l, denoted by $\xi(l)$ is defined as:

$$\xi(l) = H_x(W, q_l, p) = -\Sigma_{\alpha \in W} p_l(l(\alpha)) \log(q(l(\alpha))). \quad (4)$$

Given a window W, the method 400, at steps 410 and 412, computes a cross entropy value $\xi(l)$ for every pixel l of I within the window W. At step 410, a texture cross entropy is computed using Equation 4, where the $x_l$ values of Equation 1 are the gradient vectors in the one-dimensional texture histograms (global and local HIST_T)—each $x_i$ is a one-dimensional value. At step 412, a color cross entropy is computed using Equation 4, where the $x_i$ values of Equation 1 are the H,S value pairs in the two-dimensional color histograms (global and local HIST_C)—each $x_i$ is a two-dimensional value. At step 414, the color and texture cross entropy values for the salient point are summed to form a salient point cross entropy value. At step 416, the cross entropy value is compared to a threshold (e.g., fixed, but in some embodiments the threshold may be variable in view of frame content or other factors). If the cross entropy is larger than the threshold, the method 400 deems the salient point to be significant enough to be used as part of an index value for the frame.

At step 418, the method 400 stores the cross entropy value (e.g., as a portion of the salient point data of FIG. 1) in memory. If, at step 416, the method 400 does not deem the point as significant, the method 400 proceeds to step 420, where the method 400 queries whether another salient point is available for cross entropy processing. If another point is available, the method 400 returns to step 404 to process the next salient point within the frame or, if no additional salient points remain to be processed in the frame, the method continues to step 422 and ends (i.e., return to step 212 of FIG. 2).

Figure 5:
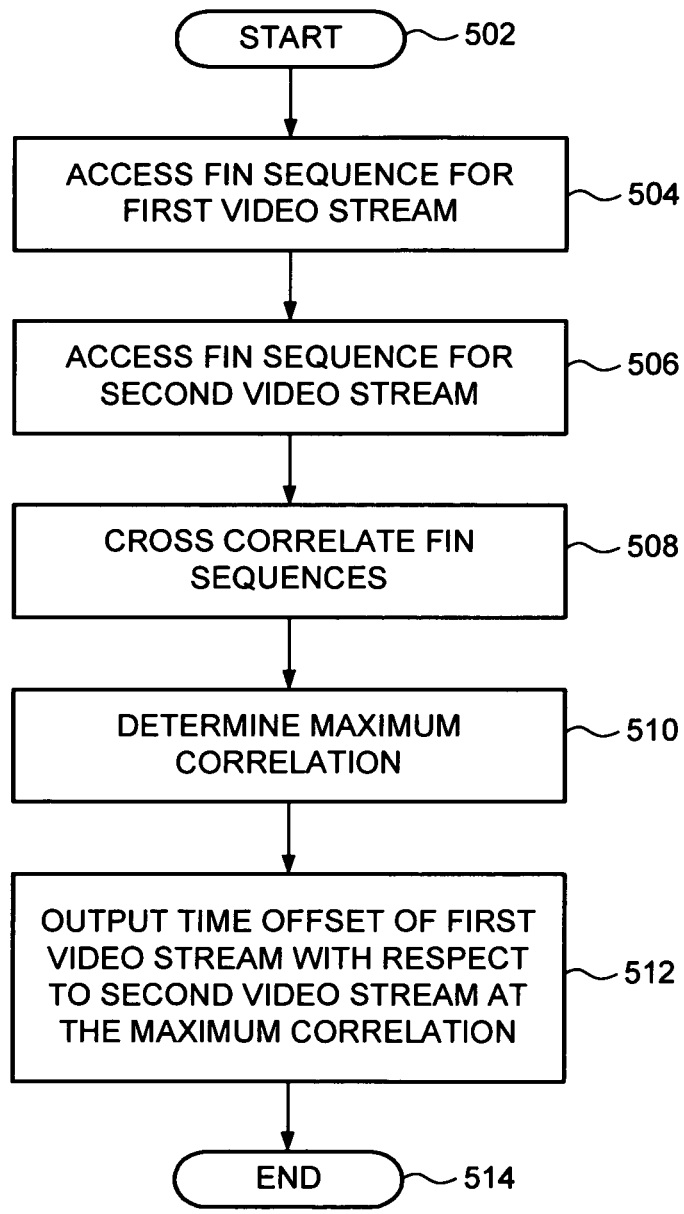
FIG. 5 illustrates a flow diagram of a method for utilizing the frame information numbers for determining time offset of a first video stream with respect to a second video stream, according to one or more embodiments.

FIG. 5 illustrates a flow diagram of a method 500 for utilizing the FINs for determining a time offset of a first video stream with respect to a second video stream, according to one or more embodiments. This method 500 is one embodiment of a method that is performed when executing index utilization software 128 of FIG. 1. The method 500 starts at step 502 and proceeds to step 504, where the FIN sequence (index value) for first video stream is accessed.

FINs enable alignment between video streams (i.e., the first video stream and the second video stream from the first video source 102 and the second video source 104 respectively of FIG. 1) based on the information content of the frames. At step 506, FIN sequence (index value) for second video stream is accessed or otherwise produced. In an embodiment, the method 500 accesses the FIN sequence of the second video stream coming from the second video source 104. At step 508, the FIN sequences of the first and second video streams are cross correlated. The cross-correlation is performed at various time offset values, e.g., stepping one time offset, then cross correlate, then another time offset, and repeat incrementally until the FIN sequences are completely compared.

At step 510, a correlation value forms indicia of a match between FIN sequences, e.g., a maximum cross correlation value where the cross correlation value exceeds a pre-defined threshold. In an embodiment, the method 500 determines an optimal value for a time offset that maximizes the correlation between a FIN sequence of the first video stream and a FIN sequence of the second video stream. At this time offset, the method 500 has found a substantial similarity between FINs, i.e., substantially similar content. In an alternative embodiment, a difference or ratio between the largest peak and the next largest peak is compared to a threshold and the peak location that exceeds the threshold determines the time offset that produces alignment.

At step 512, the method 500 outputs the time offset of the first video stream with respect to second video stream at the maximum correlation. This time offset may be used by a video editor to seamlessly combine the video streams or perform other video processing. The method 500 proceeds to step 514 at which the method 500 ends.

In other embodiments, a FIN-based index value may be computed for a reference stream, e.g., a stream containing a particular reference image. This index value forms a fingerprint for the reference stream. The FINs of a second stream may be compared to the fingerprint (via cross correlation or other techniques) to rapidly determine if the particular reference image appears in the second stream. Such a process is useful for indexing and searching video clips or segments to find particular scenes, people or other objects.

In other embodiments, the salient points that are represented in the FINs may be a watermark. The watermarked sequence forms a reference image. The FINs of the reference image may be compared to FINs computed from various video streams to identify unlicensed watermarked video streams (e.g., pirated video).

Video stream synchronization, fingerprinting and watermarking represent only a few of the multitude of applications that benefit from use of the embodiments described herein.

Figure 6:
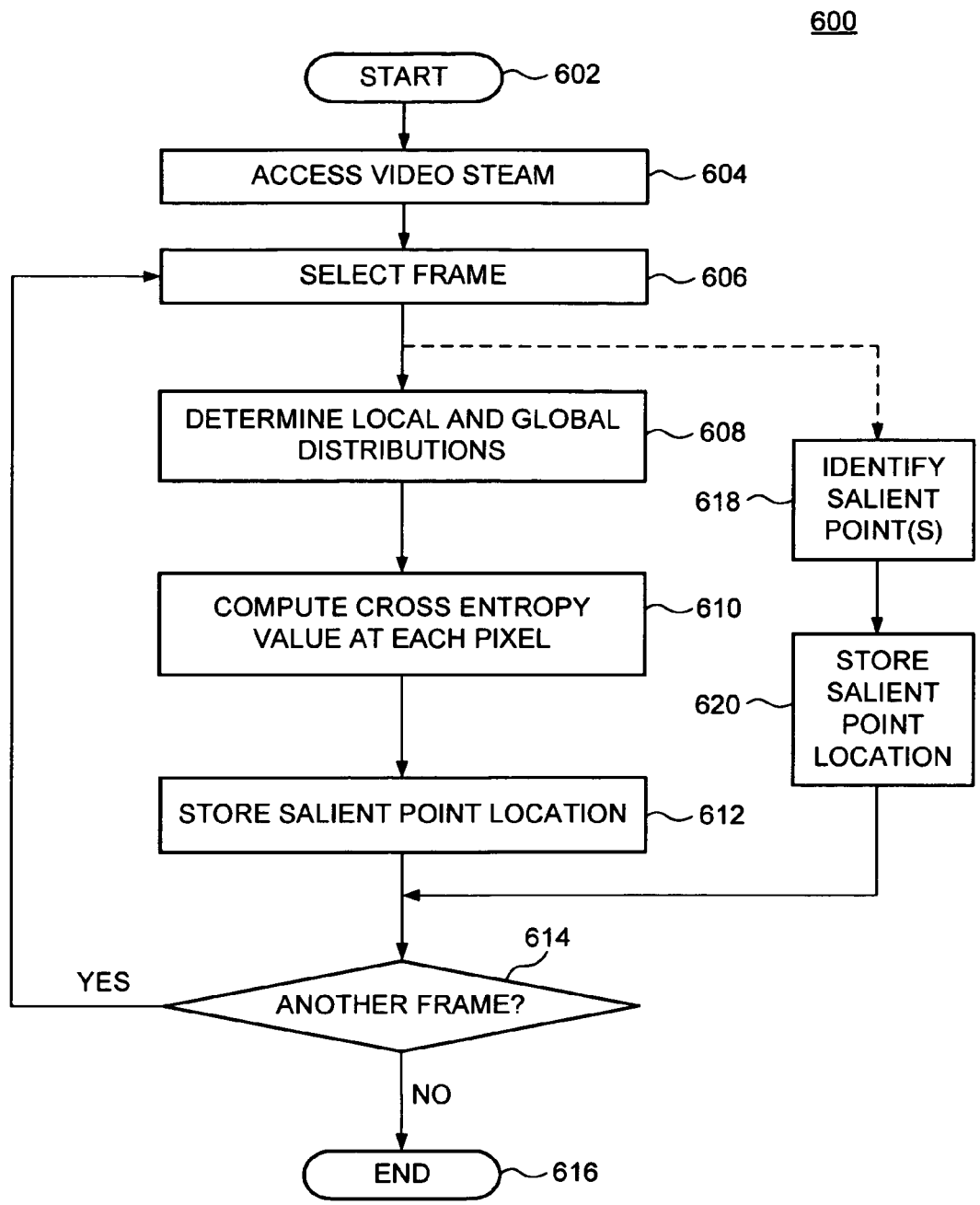
FIG. 6 illustrates a flow diagram of a method for identifying at least one salient point within an image frame in accordance with one embodiments.

FIG. 6 illustrates a flow diagram of a method 600 for identifying at least one salient point within a frame comprising a plurality of pixels, according to one or more embodiments. The method 600 represents an embodiment resulting from execution of the salient point identifier 124 of FIG. 1. In one embodiment, the method 600 is generally called from step 208 of FIG. 2.

The method 600 starts at step 602 and proceeds to step 604, at which a video stream is accessed. In some embodiments, the video stream may be subsampled to reduce the number of pixels to be processed. In a particular embodiment, the subsampling process reduces each 720×480 frame to 72×48 pixels.

At step 606, a frame within the video stream is selected. The selected frame may be the next frame in a sequence of frames of the video stream. In various embodiments, the set of salient points of an image (frame) may be defined using various feature detection techniques including a SIFT process, SURF process, DAISY process or Harris corner detection process. These conventional techniques may be optionally used at step 618. The locations salient point(s) identified by these conventional techniques are stored in memory at step 620. At step 614, the method 600 queries whether additional frames are to be processed. If additional frames are to be processed, the method 600 returns to step 606 to select the next frame. If no further frames are to be processed, the method 600 proceeds to step 616 and ends (i.e., returns to step 208 of FIG. 2).

In one embodiment of the invention, a cross entropy technique may be used to identify salient points within a frame. Each salient point (pixel or group of pixels) within an image/video conveys texture information and color information. One embodiment of the invention uses both texture and color information to identify salient points within the frame. The method 600 processes each pixel in a frame in the same manner that each salient point was processed using methods 300 and 400 of FIGS. 3 and 4. Generally, for each frame, a global distribution is generated and, for each pixel in the frame, a local distribution is generated. The method 600 computes a cross entropy value using the local and global distributions. The magnitude of the cross entropy value forms indicia of saliency for points in the frame.

In one embodiment, at step 608, the method 600 determines global and local probability distributions for the selected frame. In one embodiment, these distributions are generated in the same manner as the distributions were generated using the method 300 of FIG. 3. The "salient point" used in method 300 with regard to processing for the method 600 is each pixel in the frame. Thus, for the frame as a whole (or a significant portion thereof), a global distribution is generated and, for each pixel, a window is established to generate a local distribution within the window. In one embodiment, HIST_C and HIST_T histograms are generated for each pixel (local distributions using a window surrounding each selected pixel) and for the frame (global distribution).

At step 610, the method 400 of FIG. 4 is used to compute cross entropy values at each pixel (rather than at each salient point). The cross entropy value threshold (used in step 416 of FIG. 4) is set to a level that enables the cross entropy value magnitude to be used as indicia of saliency of each pixel. Thus, if the cross entropy value at a particular pixel is larger than the threshold, the method 600 deems the pixel to be a salient point and the cross entropy value is stored (at step 418 of FIG. 4).

At step 612, the method 600 stores the salient point locations for each stored cross entropy value (stored in step 418 of FIG. 4). At step 614, the method 600 queries whether additional frames are to be processed. If additional frames are to be processed, the method 600 returns to step 606 to select the next frame. If no further frames are to be processed, the method 600 proceeds to step 616 and ends (i.e., returns to step 208 of FIG. 2).

If the cross entropy based salient point identifier method 600 is used, the cross entropy values are defined during the salient point identification process. As such, in any embodiment that uses the method 200 of FIG. 2 subsequent to using method 600 to compute cross entropy values, will not need to compute the cross entropy values again. Any use made of these values during the indexing method requires the cross entropy values of the salient points to be recalled from memory.

Example Video Alignment Computer

Figure 7:
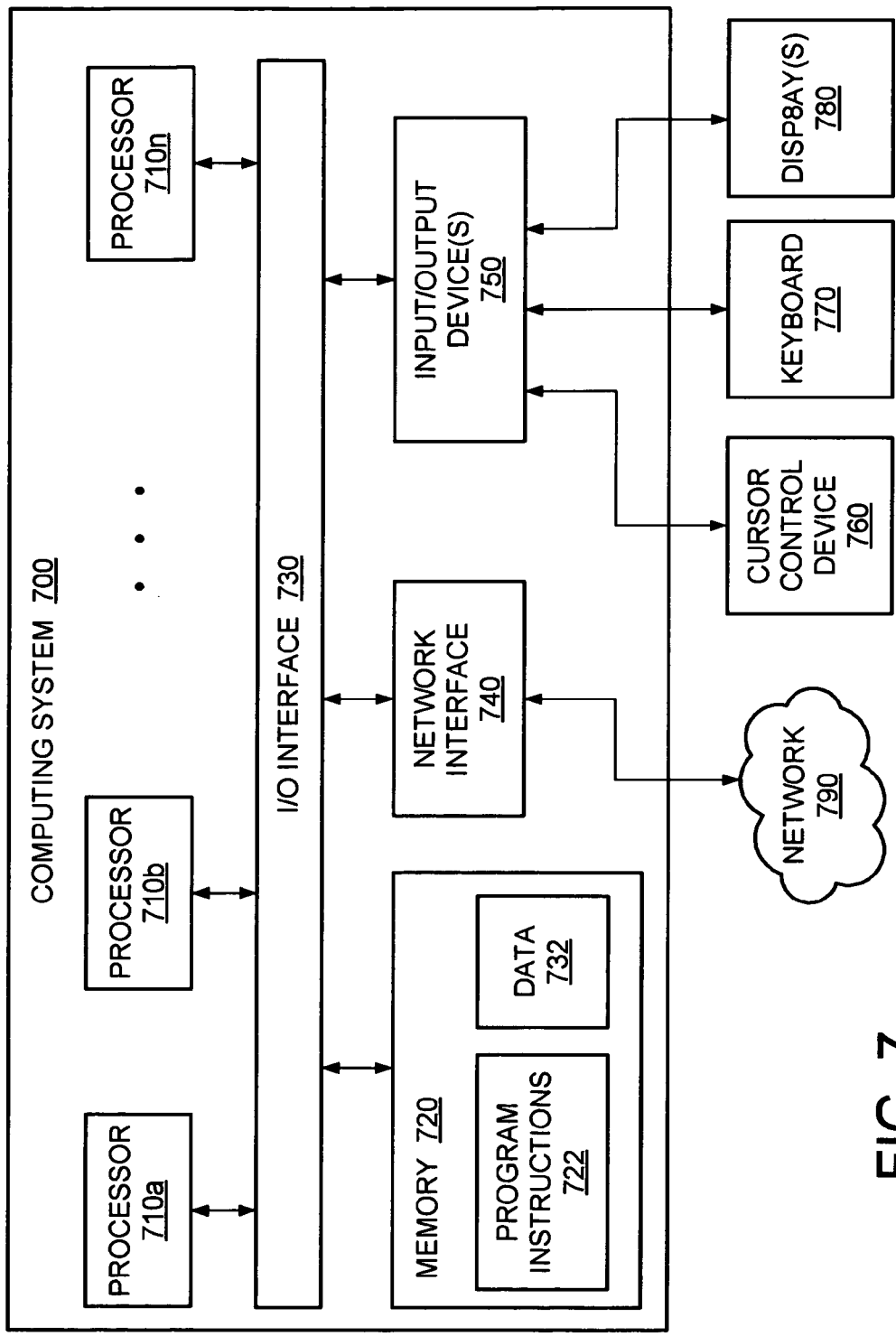
FIG. 7 is a block diagram of a computing system that can be used as a video alignment computer, according to one or more embodiments.

FIG. 7 is a block diagram of a computing system 700 that can be used as a video processing computer 106, according to one or more embodiments.

Various embodiments of a method and apparatus for processing video, as described herein, may be executed on one or more computers. One of such computing system 700 may be one or more video processing computer 106 as illustrated by FIG. 7, which may in various embodiments implement any of the elements or functionality illustrated in FIGS. 1-6. In various embodiments, the system 700 may be configured to process video streams as described above. While the illustrated system 700 may be used to implement any other system, device, element, functionality or method of the above-described embodiments. In the illustrated embodiments, system 700 may be configured to implement the video processing software and video indexing software as processor-executable executable program instructions 722 (e.g., program instructions executable by processor(s) 710) in various embodiments.

In the illustrated embodiment, the system 700 includes one or more processors 710 coupled to a device memory 720 via an input/output (I/O) interface 730. The system 700 may further includes a network interface 740 coupled to I/O interface 730, and one or more input/output devices 750, such as cursor control device 760, keyboard 770, and display(s) 780. In various embodiments, any of components 760-780 may be utilized by the content display software 116 to receive user input. In various embodiments, a user interface may be generated and displayed on display 780. In some cases, it is contemplated that embodiments may be implemented using a single instance of the system 700, while in other embodiments multiple such devices make up the system 700, may be configured to host different portions or instances of various embodiments. For example, in one embodiment some elements may be implemented via one or more devices of the system 700 that are distinct from those devices implementing other elements. In another example, multiple devices may implement the system 700 in a distributed manner.

In different embodiments, the system 700 may be any of various types of devices where web page customization would be useful, including, but not limited to, a mobile phone, a Personal Digital Assistant (PDA), laptop, notebook, or netbook computer, handheld computer, a camera, a set top box, a consumer device, video game console, handheld video game device, or in general any type of computing or electronic device having a display screen of limited size.

In various embodiments, the system 700 may be a uniprocessor device including one processor 710, or a multiprocessor device including several processors 710 (e.g., two, four, eight, or another suitable number). Processors 710 may be any suitable processor capable of executing instructions. For example, in various embodiments processors 710 may be general-purpose or embedded processors implementing any of a variety of instruction set architectures (ISAs), such as the x96, PowerPC, SPARC, or MIPS ISAs, or any other suitable ISA. In multiprocessor systems, each of processors 710 may commonly, but not necessarily, implement the same ISA.

Device memory 720 may be configured to store program instructions 722 and/or data 732 accessible by processor 710. In various embodiments, device memory 720 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing any of the elements of the embodiments described above may be stored within device memory 720. In other embodiments, program instructions and/or data may be received, sent or stored upon different types of computer-accessible media or on similar media separate from device memory 720 or the system 700.

In one embodiment, I/O interface 730 may be configured to coordinate I/O traffic between processor 710, device memory 720, and any peripheral devices in the device, including network interface 740 or other peripheral interfaces, such as input/output devices 750, In some embodiments, I/O interface 730 may perform any necessary protocol, timing or other data transformations to convert data signals from one components (e.g., device memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to device memory 720, may be incorporated directly into processor 710.

Network interface 740 may be configured to allow data to be exchanged between the system 700 and other devices attached to a network (e.g., network 740), such as one or more external devices or between the system 700. In various embodiments, network 740 may include one or more networks including but not limited to Local Area Networks (LANs) (e.g., an Ethernet or corporate network), Wide Area Networks (WANs) (e.g., the Internet), wireless data networks, some other electronic data network, or some combination thereof. In various embodiments, network interface 740 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 750 may, in some embodiments, include one or more display terminals, keyboards, keypads, touchpads, scanning devices, voice or optical recognition devices, or any other devices suitable for entering or accessing data by one or more the system 700. Multiple input/output devices 750 may be present in the system 700. In some embodiments, similar input/output devices may be separate from the system 700 and may interact with one or more display devices 700 through a wired or wireless connection, such as over network interface 740.

In some embodiments, the illustrated computing system may implement any of the methods described above, such as the methods illustrated by the flowcharts of FIGS. 2-3. In other embodiments, different elements and data may be included.

Those skilled in the art will appreciate that the system 700 is merely illustrative and is not intended to limit the scope of embodiments. In particular, the display device and devices may include any combination of hardware or software that can perform the indicated functions of various embodiments, including computers, network devices, Internet appliances, PDAs, wireless phones, pagers, etc. The system 700 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated display device via inter-computer communication. Some or all of the device components or data structures may also be stored (e.g., as instructions or structured data) on a computer-accessible medium or a portable article to be read by an appropriate drive, various examples of which are described above. In some embodiments, instructions stored on a computer-accessible medium separate from the system 700 may be transmitted to the system 700 via transmission media or signals such as electrical, electromagnetic, or digital signals, conveyed via a communication medium such as a network and/or a wireless link. Various embodiments may further include receiving, sending or storing instructions and/or data implemented in accordance with the foregoing description upon a computer-accessible medium or via a communication medium. In general, a computer-accessible medium may include a storage medium or memory medium such as magnetic or optical media, e.g., disk or DVD/CD-ROM, volatile or non-volatile media such as RAM (e.g., SDRAM, DDR, RDRAM, SRAM, etc.), ROM, etc.

The methods described herein may be implemented in software, hardware, or a combination thereof, in different embodiments. In addition, the order of methods may be changed, and various elements may be added, reordered, combined, omitted, modified, etc. All examples described herein are presented in a non-limiting manner. Various modifications and changes may be made as would be obvious to a person skilled in the art having benefit of this disclosure. Realizations in accordance with embodiments have been described in the context of particular embodiments. These embodiments are meant to be illustrative and not limiting. Many variations, modifications, additions, and improvements are possible. Accordingly, plural instances may be provided for components described herein as a single instance. Boundaries between various components, operations and data stores are somewhat arbitrary, and particular operations are illustrated in the context of specific illustrative configurations. Other allocations of functionality are envisioned and may fall within the scope of claims that follow. Finally, structures and functionality presented as discrete components in the example configurations may be implemented as a combined structure or component. These and other variations, modifications, additions, and improvements may fall within the scope of embodiments as defined in the claims that follow.

While the foregoing is directed to embodiments of the present invention, other and further embodiments of the invention may be devised without departing from the basic scope thereof, and the scope thereof is determined by the claims that follow.

The invention claimed is:

1. A computer implemented method for indexing a video stream comprising:
 accessing the video stream comprising a plurality of frames, for each frame:
 determining salient points;
 computing a cross entropy value for each salient point; and
 summing all cross entropy values to form a frame information number, where a sequence of frame information numbers for the plurality of frames in the video stream forms an index value for the video stream.

2. The method of claim 1, further comprising:
 cross correlating a first index value for a first video stream with a second index value of a second video stream at various time offsets;
 determining a cross correlation value providing an indicia of a match between the first index value and the second index value; and
 determining a time offset between the first video stream and the second video stream based upon the cross correlation value.

3. The method of claim 1 further comprising comparing an index value of a first video stream to an index value of a second video stream.

4. The method of claim 3 further comprising determining common content within the first video stream and the second video stream.

5. The method of claim 1 further comprising creating a reference index value from a reference video stream.

6. The method of claim 5 further comprising:
 comparing a target index value for a target video stream to the reference index value; and;
 determining at least one of difference or common content based upon a result of the comparison.

7. The method of claim 1 wherein determining salient points further comprises performing at least one of DAISY processing, SIFT processing, SURF processing, Harris corner processing, or cross entropy processing.

8. The method of claim 1 wherein determining salient points further comprises performing cross entropy processing using either a fixed window size or a variable window size.

9. The method of claim 1 wherein determining salient points further comprises calculating saliency of a point as a sum of the texture saliency and a color saliency.

10. An apparatus for indexing a video stream comprising:
a video processing computer for accessing the video stream, the video stream comprising a plurality of frames, for each frame determining salient points, computing a cross entropy value for each salient point, and summing all cross entropy values to form a frame information number, where a sequence of frame information numbers for the plurality of frames in the video streams forms an index value for the video stream.

11. The apparatus of claim 10, wherein the video indexing computer cross correlates a first index value for a first video stream with a second index value for a second stream, determines a maximum cross correlation value, and determines a time offset between the first video stream and the second video stream based upon the maximum cross correlation value.

12. The apparatus of claim 10, wherein the video processing computer determines common content within the first video stream and the second video stream.

13. A non-transitory computer-readable-storage medium comprising one or more processor-executable instructions that, when executed by at least one processor, causes the at least one processor to:
access the video stream comprising a plurality of frames, for each frame:
determine salient points;
compute a cross entropy value for each salient point; and
sum all cross entropy values to form a frame information number, where a sequence of frame information numbers for the plurality of frames in the video streams forms an index value for the video stream.

14. The non-transitory computer-readable-storage medium of claim 13, wherein the instructions further cause the at least one processor to:
cross correlate a first index value for a first video stream with a second index value of a second video stream at various time offsets;
determine a cross correlation value providing an indicia of a match between the first index value and the second index value; and
determine a time offset between the first video stream and the second video stream based upon the cross correlation value.

15. The non-transitory computer readable medium of claim 13, wherein determining salient points further comprises performing at least one of DAISY processing, SIFT processing, SURF processing, Harris corner processing, or cross entropy processing.

16. The non-transitory computer readable medium of claim 13 wherein determining salient points further comprises performing cross entropy processing using either a fixed window size or a variable window size.

17. The non-transitory computer readable medium of claim 13, wherein the instructions further cause the at least one processor to calculate saliency of a point as a sum of the texture saliency and a color saliency.

18. The non-transitory computer readable medium of claim 13, wherein the instructions further cause the at least one processor to compare an index value of the first video stream to an index value of the second video stream.

19. The non-transitory computer readable medium of claim 17, wherein the instructions further cause the at least one processor to utilize the index values to determine common content between the first video stream and the second video stream.

20. The non-transitory computer readable medium of claim 13, wherein the instructions further cause the at least one processor to create a reference index value from a reference video stream.

* * * * *